United States Patent [19]

Haga et al.

[11] Patent Number: 5,515,938

[45] Date of Patent: May 14, 1996

[54] HYDRAULIC POWER STEERING APPARATUS

[75] Inventors: Kyosuke Haga, Anjo; Mikio Suzuki, Hekinan; Yoshiharu Inaguma, Nagoya; Kenichi Fukumura; Hideya Kato, both of Aichi; Katsuhisa Mori, Okazaki, all of Japan

[73] Assignee: Toyoda Koki Kabushiki Kaisha, Kariya, Japan

[21] Appl. No.: 138,963

[22] Filed: Oct. 21, 1993

[30] Foreign Application Priority Data

| Oct. 22, 1992 | [JP] | Japan | 4-284775 |
| Oct. 22, 1992 | [JP] | Japan | 4-284776 |
| Oct. 22, 1992 | [JP] | Japan | 4-284777 |

[51] Int. Cl.$^6$ .......................... B62D 5/06; B62D 5/083
[52] U.S. Cl. .......................... 180/132; 180/149
[58] Field of Search .......................... 180/132, 149, 180/141, 142

[56] References Cited

U.S. PATENT DOCUMENTS

| 4,460,016 | 7/1984 | Haga et al. . | |
| 4,469,342 | 9/1984 | Millard . | |
| 4,516,471 | 5/1985 | Duffy . | |
| 4,705,129 | 11/1987 | Fassbender | 180/132 |
| 5,092,418 | 3/1992 | Suzuki et al. | 180/149 |

FOREIGN PATENT DOCUMENTS

| 0472101 | 2/1992 | European Pat. Off. . | |
| 3346874 | 6/1984 | Germany . | |
| 3802915 | 8/1988 | Germany . | |
| 227469 | 9/1988 | Japan | 180/149 |
| 306878 | 12/1990 | Japan | 180/149 |
| 292265 | 10/1992 | Japan | 180/149 |
| 9014261 | 11/1990 | WIPO | 180/149 |

*Primary Examiner*—Mitchell J. Hill
*Attorney, Agent, or Firm*—Oblon, Spivak, McClelland, Maier & Neustadt

[57] ABSTRACT

A power steering apparatus having a fluid source for discharging pressurized fluid, a power cylinder, a control valve responsive to operation of a steering wheel for supplying the power cylinder with pressurized fluid from the fluid source, and a reservoir. The control valve has a first control portion for controlling the flow of pressurized fluid from the fluid source to the reservoir, and a second control portion for controlling the flow of pressurized fluid to the power cylinder. The first control portion has two paths connecting the fluid source and the reservoir, each of the paths being formed with at least one variable orifice of a center-open type which opens when the control valve is in a neutral state. The second control portion has two supply paths communicating with the fluid source and a pair of chambers of the power cylinder, each of the supply paths being formed with a variable orifice of a center-close type which closes when the control valve is in the neutral state, and two drain paths communicating with the pair of chambers and the reservoir, each of the drain paths being formed with a variable orifice of a center-open type which opens when the control valve is in the neutral state.

17 Claims, 13 Drawing Sheets

FIG. I (PRIOR ART)

HYDRAULIC POWER STEERING APPARATUS

BACKGROUND OF THE INVENTION

1. Field of the Invention

This invention relates to a hydraulic power steering apparatus suitable for use in automobiles and the like.

2. Discussion of Related Art

A conventional hydraulic power steering apparatus is composed of a pump 1, a reservoir 2, a power cylinder 3 for generating an assisting force, and a rotary valve 4, as shown in FIG. 1. The rotary valve 4 is composed of a pair of bridge circuits having variable orifices 4A–4D and 4E–4H, respectively. When the steering wheel 6 is rotated, the rotary valve 4 is operated so that the pressurized fluid output from the pump 1 is supplied to one of the chambers of the power cylinder 3, while fluid is drained from the other of the chambers to the reservoir 2. Although the power cylinder 3 is illustrated in the drawing as being arranged in each of the bridge circuits C1 and C2, the cylinder 3 is a single cylinder.

In such power steering apparatus, the rotary valve 4 is desired to have such a characteristic that the differential pressure in the power cylinder 3 is reduced to zero at rotational angle positions near the neutral position (rotational angle positions smaller than a predetermined angle position θ1), whereby the generation of the assisting force is stopped. With this characteristic, it becomes possible to give a driver a steady steering feeling similar to that in a non-assisted power steering apparatus in the vicinity of the neutral position.

However, the conventional rotary valve does not have the above-mentioned desired characteristic. Namely, in the conventional power steering apparatus, the opening areas of the variable orifices 4A–4H immediately start to increase in response to the rotation of the steering wheel 6, even when the steering wheel 6 is located near the neutral position. Accordingly, the differential pressure in the power cylinder 3 immediately starts to increase and gradually increases even more as the rotational angle increases.

Since the rotational angle at which the power assistance is started is not unclear, the conventional power steering apparatus gives the driver no steady steering feeling but instead a vague feeling in the vicinity of the neutral position.

SUMMARY OF THE INVENTION

An object of the present invention is to provide an improved power steering apparatus capable of providing a driver with an improved steering feeling.

Another object of the present invention is to provide an improved power steering apparatus capable of reducing energy consumption.

Briefly, the present invention provides a power steering apparatus having a fluid source for discharging pressurized fluid, a power cylinder, a control valve responsive to operation of a steering wheel for supplying the power cylinder with pressurized fluid from the fluid source, and a reservoir. The control valve has a first control portion for controlling the flow of pressurized fluid from the fluid source to the reservoir, and a second control portion for controlling the flow of pressurized fluid to the power cylinder. The first control portion has a path connecting the fluid source and the reservoir, the path being formed with at least one variable orifice of a center-open type which opens when the control valve is in a neutral state. The second control portion has two supply paths communicating with the fluid source and a pair of chambers of the power cylinder, each of the supply paths being formed with a variable orifice of a center-close type which closes when the control valve is in the neutral state.

In the power steering apparatus having the above-mentioned constitution, the differential pressure in the cylinder is maintained extremely low or substantially zero when the steering wheel is located at an angular position near the neutral position. Therefore, in the vicinity of the neutral position, the steering feeling becomes the same as or similar to that in a non-assisted steering apparatus, thereby allowing the driver to feel the neutral position of the steering wheel. This also increases the steady feeling in the vicinity of the neutral position, and lets the driver feel the start of power assistance. These characteristics improve the steering feeling.

In an aspect of the present invention, the power steering apparatus further comprises flow rate control means for reducing the amount of fluid supplied to the control valve when the control valve is in the neutral state and increasing the amount of the fluid in accordance with an increase in the back pressure of the control valve.

According to the above-mentioned constitution, it becomes possible to reduce the amount of pressurized fluid supplied from the pump during steering operation, thereby reducing the energy consumption of the pump.

In further aspect of the present invention, the fluid source is composed of a pump, and the power steering apparatus further comprises a motor for driving the pump, detection means for detecting steering operation of the steering wheel, and control means for controlling the rotational speed of the motor in response to a signal output from the detection means. This constitution also reduces the energy consumed by the pump.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
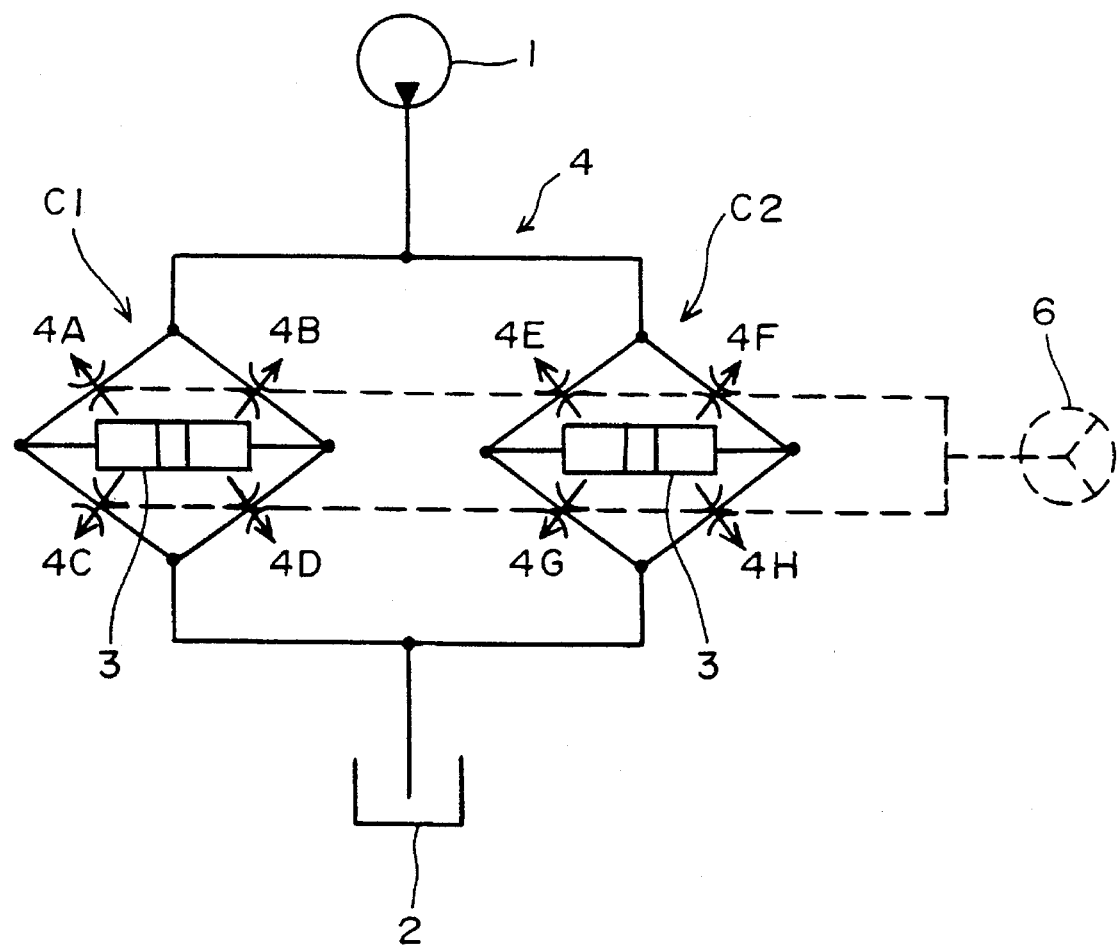
FIG. 1 is a diagram showing a conventional power steering apparatus.
Figure 2:
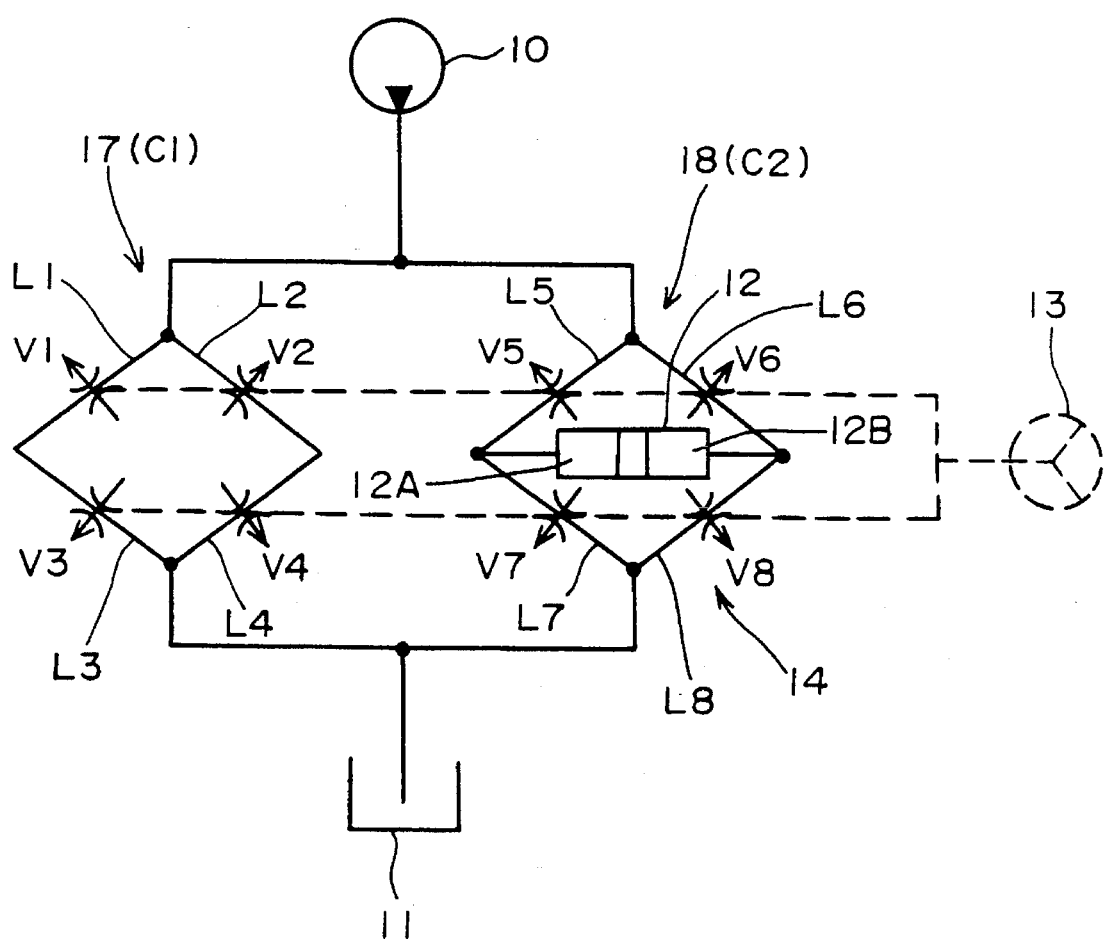
FIG. 2 is a diagram showing a power steering apparatus according to a first embodiment of the present invention.

Preferred embodiments of the present invention will now be described with reference to the drawings.

First Embodiment

A power steering apparatus according to a first embodiment is composed of a pump (pressurized fluid source) 10 which is driven by a not-illustrated engine so as to discharge pressurized fluid at a constant rate, a reservoir 11, a power cylinder 12 for assisting the steering operation, and a rotary control valve 14 which is responsive to rotation of a steering wheel 13 so as to control the flow of pressurized fluid from the pump 10 to the power cylinder 12.

Figure 3:
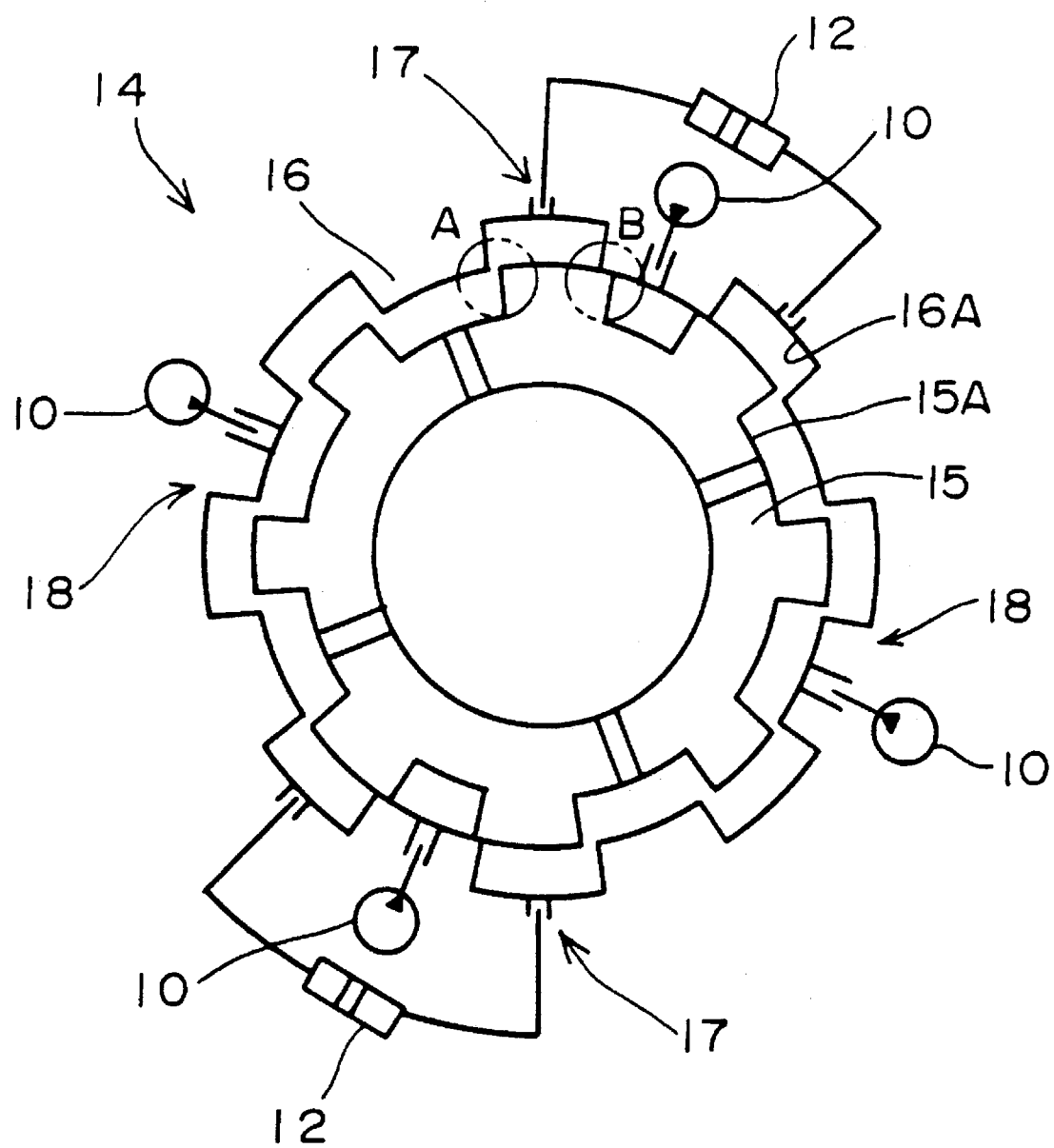
FIG. 3 is a sectional view showing the structure of the control valve shown in FIG. 2.
Figure 4:
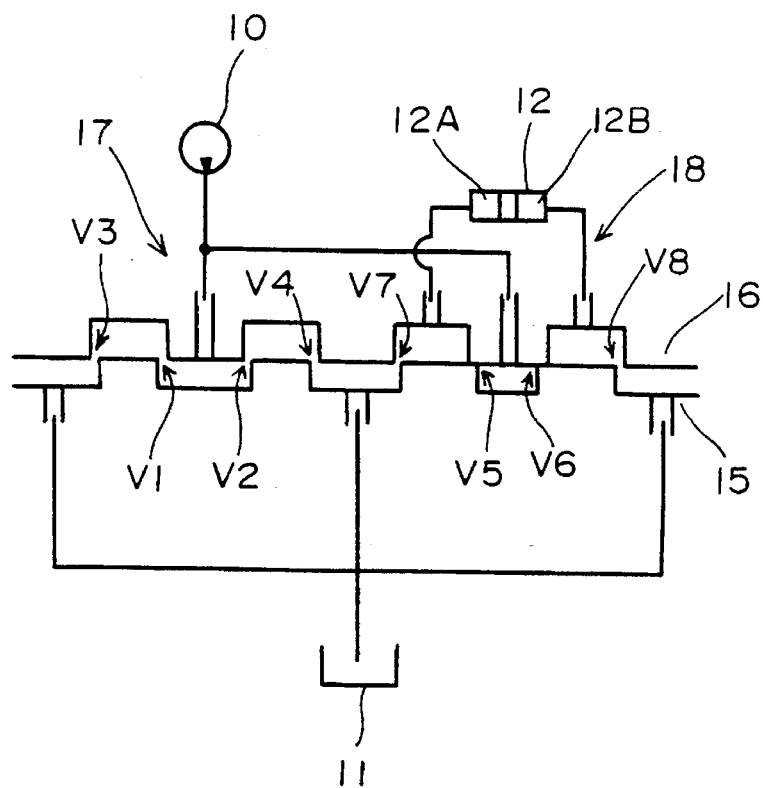
FIG. 4 is a partial development of the control valve shown in FIG. 3.

As shown in FIGS. 3 and 4, the control valve 14 is mainly composed of a valve shaft 15 coupled to the steering wheel 13 for rotation therewith, a valve body 16 arranged to surround the valve shaft 15 in a coaxial relationship with the valve shaft 15, a not-illustrated torsion bar for connecting the valve shaft 15 and the valve body 16, and a not-illustrated valve housing for receiving the above-mentioned components. The valve body 16 is mechanically connected to a steering linkage to which hydraulic force generated by the power cylinder 12 is applied. Each of the outer surface of the valve shaft 15 and the inner surface of the valve body 16 is provided with a plurality (eight in this embodiment) of depressed portions 15A or 16A, which are formed at predetermined intervals in the circumferential direction. Thus, two kinds of control portions, i.e., first control portions 17 and second control portions 18 are alternately formed at intervals of 90 degrees in the circumferential direction between the valve shaft 15 and the valve body 16 so as to control the flow of pressurized fluid.

Figure 5:
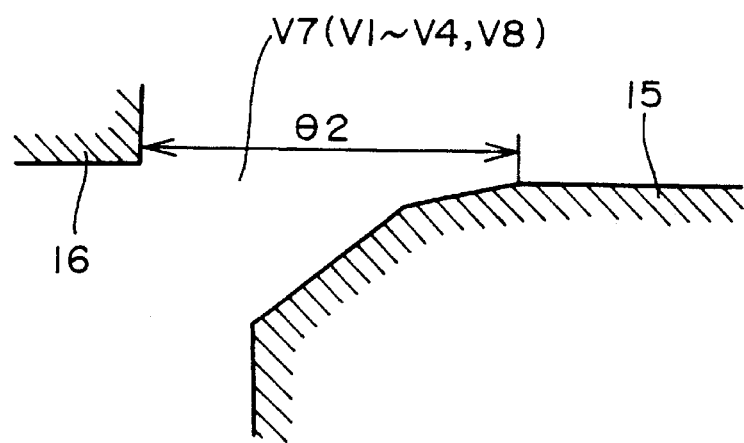
FIG. 5 is an enlarged view of the portion A of FIG. 3.
Figure 7:
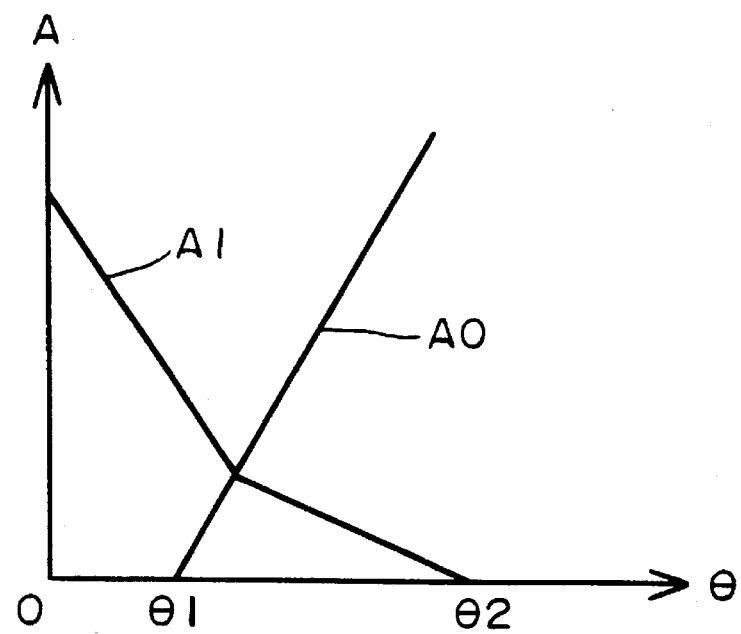
FIG. 7 is a graph showing the relationship between the relative rotational angle of the valve and the effective opening areas of the variable orifices.

The first control portion 17 is composed of a first bridge circuit C1 having four fluid paths L1, L2, L3 and L4 which are connected to the pump 10 and the reservoir 11, and four variable orifices V1, V2, V3 and V4 are disposed in the middle of the fluid paths L1, L2, L3 and L4, respectively. Each of the variable orifices V1, V2, V3 and V4 is of a so-called center-open type, the initial state (neutral state) of which is shown in FIG. 5. Each of the variable orifices V1, V2, V3 and V4 has such a characteristic that the opening area of each orifice changes in accordance with relative rotation (valve rotational angle) between the valve shaft 15 and valve body 16, as illustrated by the line A1 in FIG. 7.

Figure 6:
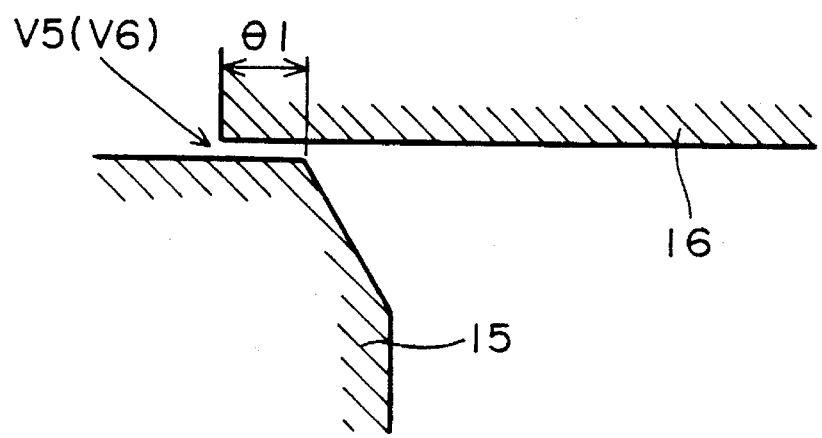
FIG. 6 is an enlarged view of the portion B of FIG. 3.

The second control portion 18 is composed of a second bridge circuit C2 having four fluid paths or passage L5, L6, L7 and L8 which are connected to the pump 10, both fluid chambers 12A and 12B of the power cylinder 12 and the reservoir 11, and four variable orifices V5, V6, V7 and V8 are disposed in the middle of the fluid paths L5, L6, L7 and L8, respectively. Each of the variable orifices V5 and V6 communicating with the pump 10 is of a so-called center-close type and the initial state of which is shown in FIG. 6. Each of the variable orifices V7 and V8 communicating with the reservoir 11 is of a center-open type and the initial state of which is shown in FIG. 5. Each of the variable orifices V5 and V6 has such a characteristic that the opening area of each orifice changes in accordance with relative rotation (valve rotational angle) between the valve shaft 15 and valve body 16, as illustrated by the line A0 in FIG. 7. Each of the variable orifices V7 and V8 has such a characteristic that the opening area of each orifice changes in accordance with relative rotation (valve rotational angle) between the valve shaft 15 and valve body 16, as illustrated by the line A1 in FIG. 7.

The operation of the power steering apparatus according to this embodiment will now be explained. When the operation of the pump 10 is initiated, pressurized fluid is discharged from the pump 10 and supplied to the first and second bridge circuits C1 and C2. When the steering wheel 13 is not rotated, i.e., the control valve 14 is in its neutral state, the variable orifices V5 and V6 of the second bridge C2 are closed. In such a state, the pressurized fluid is not supplied to the power cylinder 12, and both fluid chambers 12A and 12B are allowed to communicate with the reservoir 11 so that the internal pressures of the fluid chambers 12A and 12B of the power cylinder 12 is maintained extremely low or zero. The pressurized fluid output from the pump 10 is drained to the reservoir 11 through the variable orifices V1, V2, V3 and V4 of the bridge circuit C1 without resistance.

Figure 8:
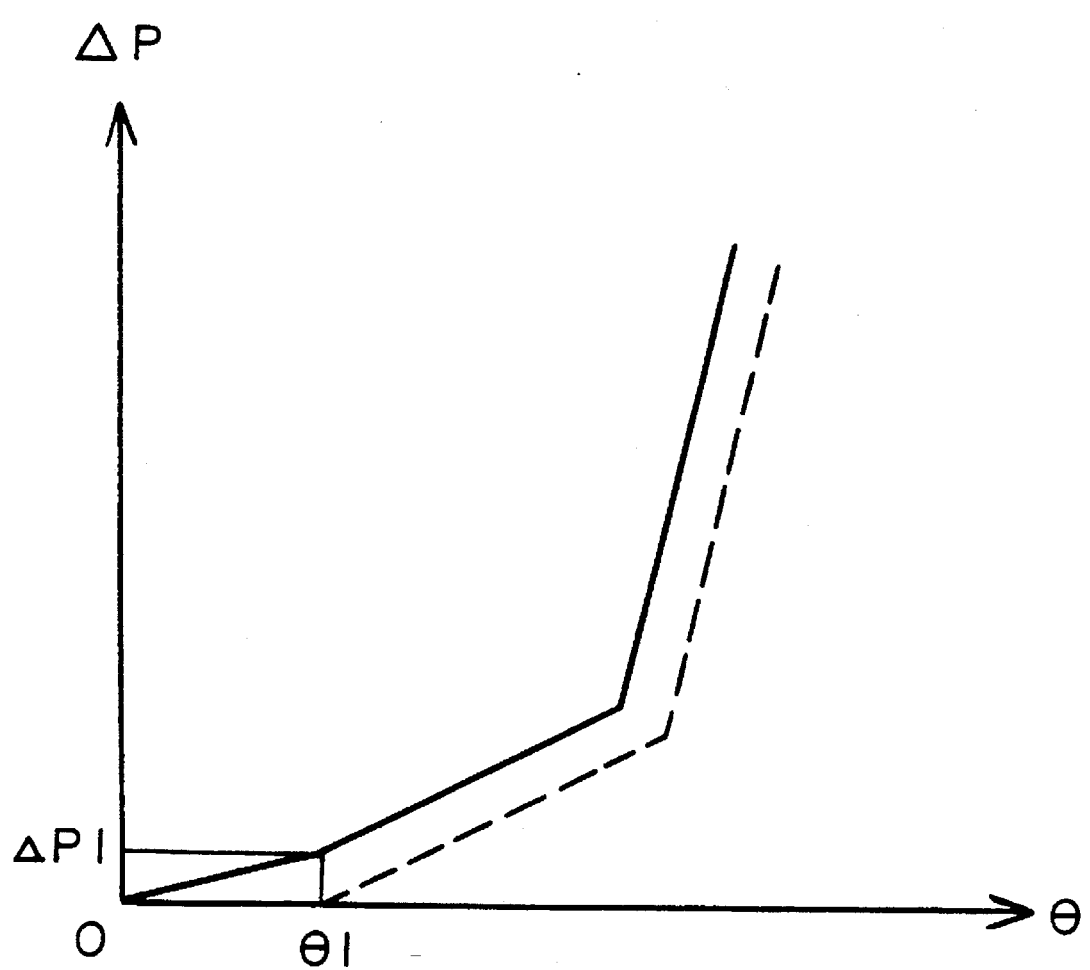
FIG. 8 is a graph showing the relationship between the relative rotational angle of the valve and the differential pressure in the power cylinder.

When the steering operation of the steering wheel 13 produces a rotation of the valve shaft 15 relative to the valve body 16, for example, in the counterclockwise direction as viewed in FIG, 3 (in the leftward direction in FIG. 4), the opening areas of the variable orifices V1 and V4 of the first bride C1 increase while the opening areas of the remaining variable orifices V2 and V3 decrease. In response to this, the pressure of the fluid output from the pump 10, i.e. the back pressure of the control valve 14 gradually increases. However, the differential pressure ΔP produced between the fluid chambers 12A and 12B of the power cylinder 12 is maintained to be zero until the rotational angle of the valve 14 reaches θ1, because the variable orifices V5 and V6 of the second bridge circuit C2 are in the closed state until the rotational angle of the valve 14 reaches θ1. Accordingly, in the neutral zone in which the rotational angle of the valve 14 is smaller than θ1, it becomes possible to prevent the difference pressure ΔP between the fluid chambers 12A and 12B of the power cylinder 12 from increasing, as illustrated by the broken line in FIG. 8. In such a state, a steering feeling similar to that in the non-assisted steering apparatus can be given to the driver.

When the rotational angle of the valve 14 exceeds θ1, one of the variable orifices V5 and V6 starts to open so that the pressure in the fluid chamber 12A of the power cylinder 12 increases. The pressure in the fluid chamber 12A at this time is determined depending on the opening areas of the variable orifices V2 and V3 and the variable orifice V7 of the second bridge circuit C2. The difference in pressure between the fluid chambers 12A and 12B of the power cylinder 12 increases as the opening areas of the variable orifices V2, V3 and V7 decrease, whereby an appropriate assistance force is generated to assist the steering operation of the steering wheel 13.

Since the operation of the control valve 14 in the case where the valve shaft 15 is relatively rotated in the clockwise direction as viewed in FIG. 3 is the same as the operation mentioned above, a detailed explanation thereof will be omitted.

As explained above, in the power steering apparatus according to the present invention, the differential pressure in the cylinder is maintained extremely low or substantially zero when the steering wheel is located at an angular position near the neutral position. Therefore, in the vicinity of the neutral position, the steering feeling becomes the same as that in the non-assisted steering apparatus, whereby the driver can feel the neutral position of the steering wheel. This also enhances the steady feeling in the vicinity of the neutral position, and lets the driver feel the start of power assistance. Accordingly, the power steering apparatus according to the present invention can give the driver an improved feeling during the steering operation.

Second Embodiment

In a power steering apparatus according to a second embodiment, a control valve 14' which is similar to the control valve 14 is used in combination with a pump 10' having an improved mechanism for controlling the flow rate of pressurized fluid supplied to the control valve 14'.

The pump 10' is composed of a pump unit 20, a first and second metering orifices 22 and 23 disposed in the middle of a supply passage 21, a speed responsive orifice 24 connected to the supply passage 21 in parallel relationship with the second metering orifice 23, and a bypass valve 26 disposed in the middle of a bypass passage 25. The speed responsive orifice 24 responds to a pressure difference between the upstream side and downstream side of the first metering orifice 22 to change its effective opening area. The detailed structure of the variable orifice 24 is disclosed in U.S. Pat. No. 4,361,166. The bypass valve 26 is composed of a valve spool 26a which responds to a pressure difference between the upstream side and downstream side of the second metering orifice 23 so as to open the bypass passage 25, and a spring 27 which is received in a spring chamber of the bypass valve 26 to urge the valve spool 26a in a direction for closing the bypass passage 25. The spring chamber is connected to the supply passage 21 via a first control orifice 30, and is connected to the reservoir 11 via a relief valve 38.

Figure 11:
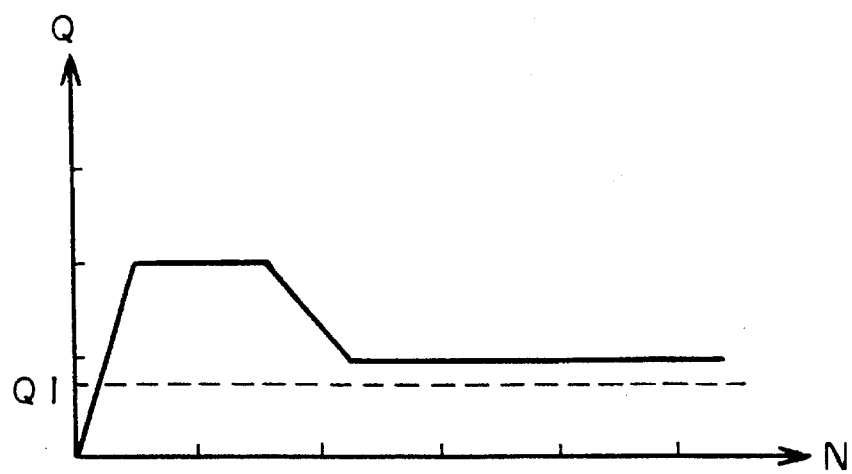
FIG. 11 is a graph showing the relationship between the running speed of an engine and the flow rate of pressurized fluid output from the speed responsive plump shown in FIG. 9.

When the rotational speed of pump unit 20 increases, the flow rate of pressurized fluid output from the pump unit 20 increases, which causes an increase in the differential pressure between the upstream side and downstream side of the first metering orifice 22. In response to the increase of the differential pressure, the opening area of the variable orifice 24 becomes smaller, and finally becomes zero when the differential pressure reaches a predetermined value. Due to the above-mentioned characteristics of the variable orifice 24, the pump 10 exhibits the flow rate characteristics shown in FIG. 11. In FIG. 11, N indicates the rotational speed of the pump unit 20 while Q indicates the flow rate.

Figure 9:
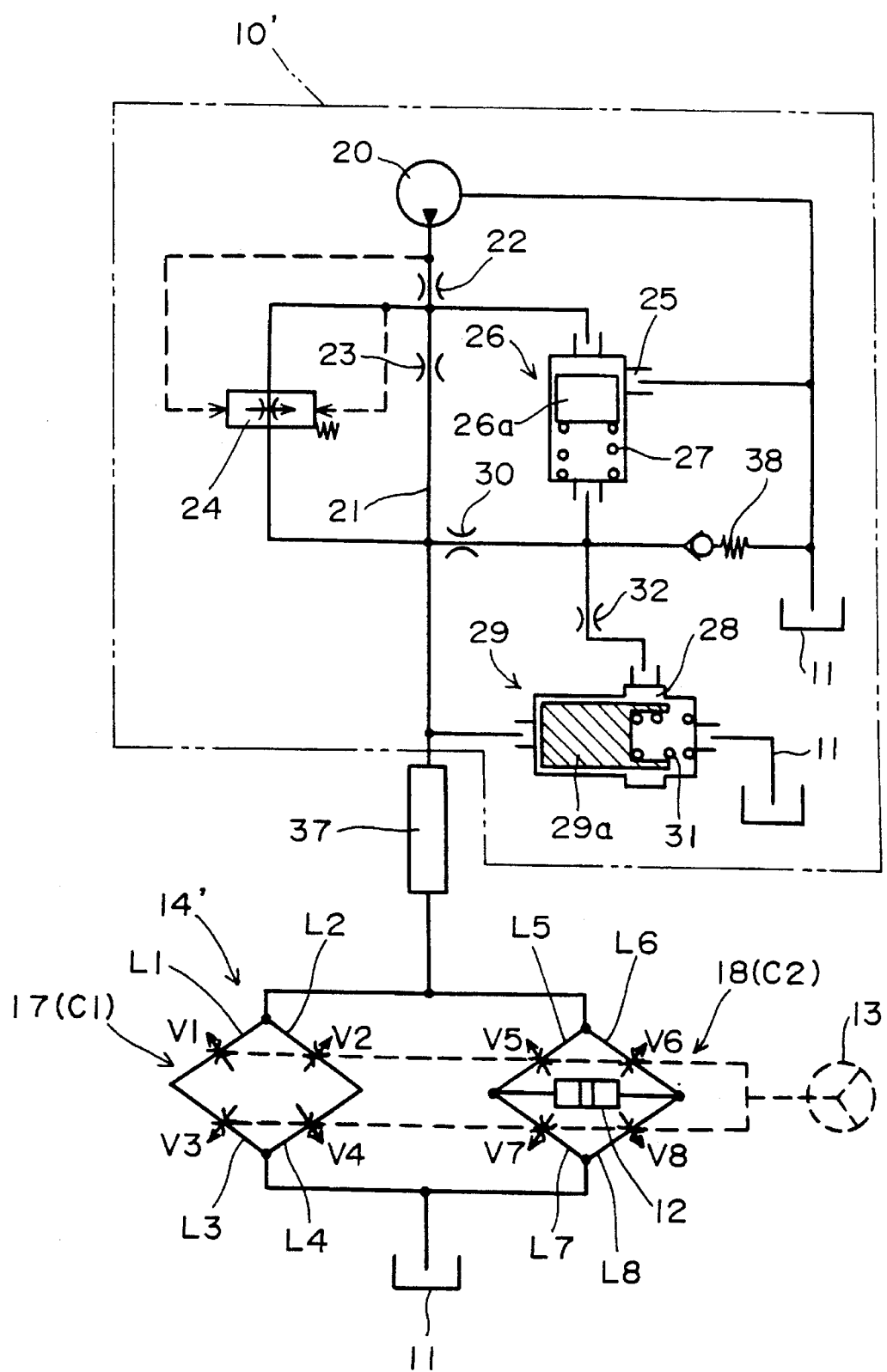
FIG. 9 is a diagram showing a power steering apparatus according to a second embodiment of the present invention.
Figure 10:
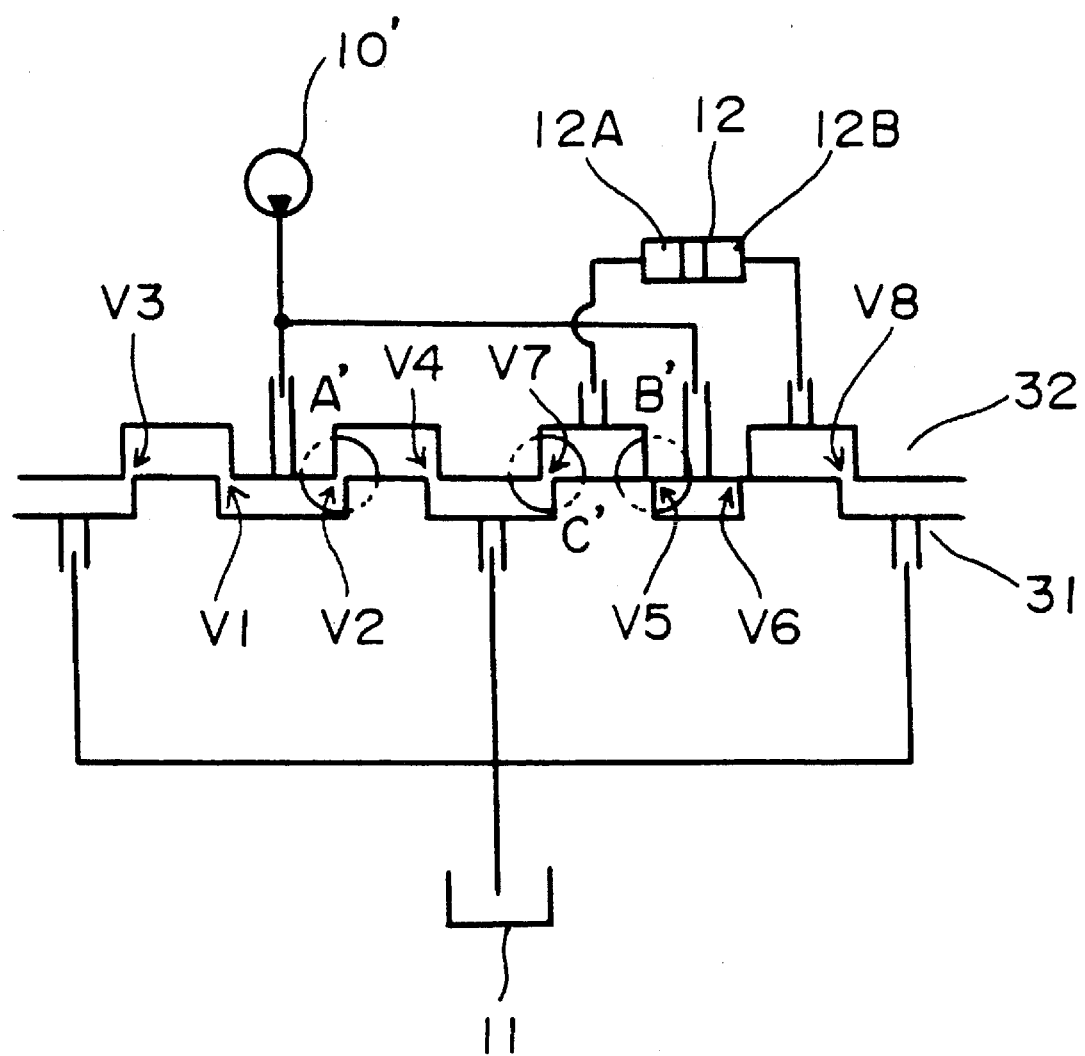
FIG. 10 is a partial development of the control valve shown in FIG. 9.
Figure 12:
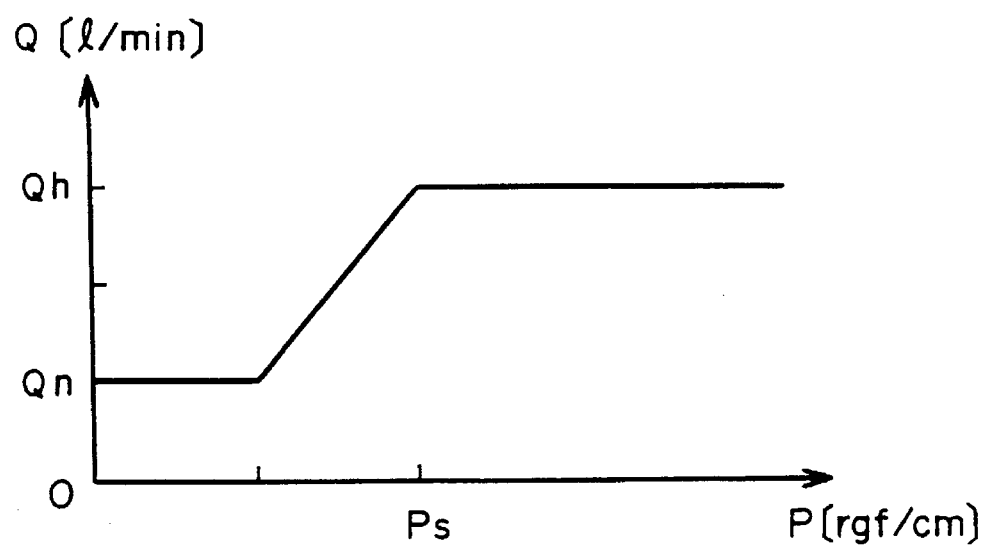
FIG. 12 is a graph showing the relationship between the back pressure and the flow rate of pressurized fluid.

Disposed in series between the spring chamber of the bypass valve 26 and the reservoir 11 are a second control orifice 32 and a load responsive valve 29 having a variable orifice portion 28. The variable orifice portion 28 is fully opened when the steering wheel 13 is located in the neutral position and the back pressure of the control valve 14' is low. When the back pressure increased to be higher than the force produced by a spring 31 received in the valve 29, the opening area of the variable orifice portion 28 is decreased. This causes an increase in the pressure in the spring chamber of the bypass valve 26, which in turn reduces the amount of bypassed fluid. Accordingly, the flow rate of pressurized fluid supplied to the valve 14' increases. FIG. 12 is a graph showing an increase in the flow rate Q of pressurized fluid which occurs in response to an increase of the back pressure P. In FIG. 9, numeral 37 indicates a supply hose for supplying pressurized fluid to the control valve 14'.

The control valve 14' is the same as the control valve 14 used in the first embodiment except for the following.

Figure 13:
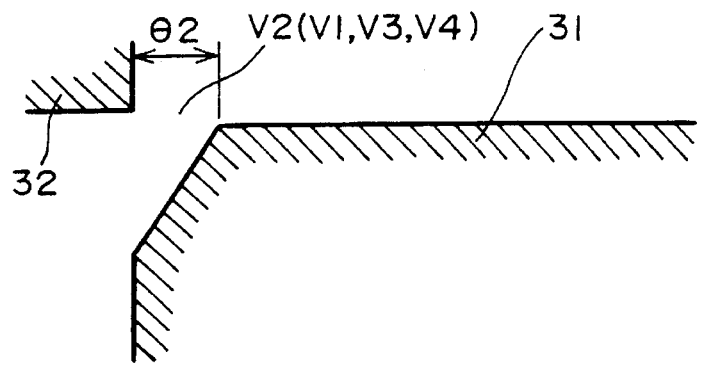
FIG. 13 is an enlarged view of the portion A' of FIG. 10.
Figure 14:
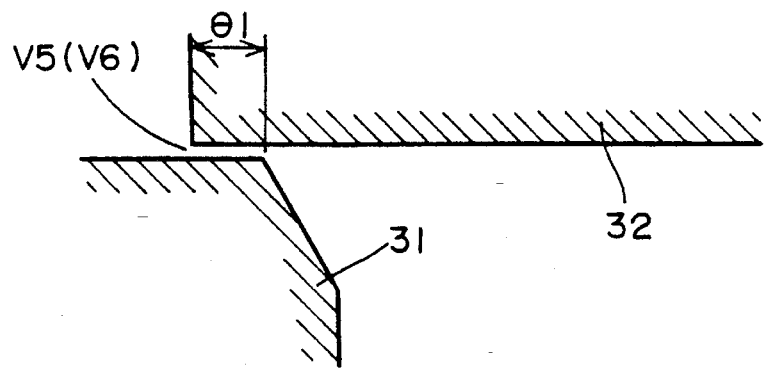
FIG. 14 is an enlarged view of the portion B' of FIG. 10.
Figure 15:
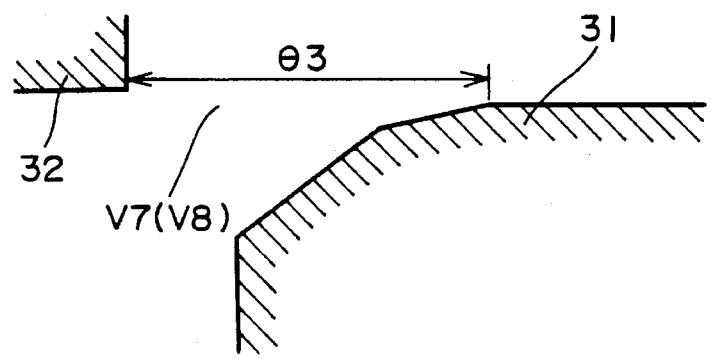
FIG. 15 is an enlarged view of the portion C' of FIG. 10.
Figure 16:
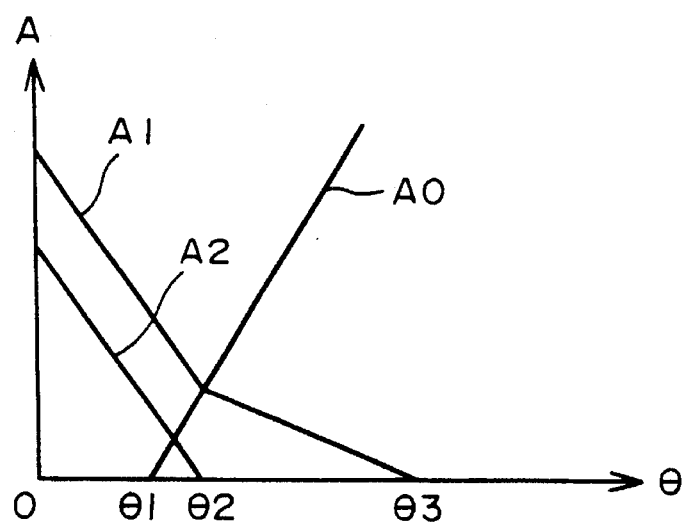
FIG. 16 is a graph showing the relationship between the relative rotational angle of the valve and the effective opening areas of the variable orifices.

In this embodiment, each of the variable orifices V1, V2, V3 and V4 of the first bridge circuit C1 is a semi center-open type, the initial state of which is shown in FIG. 13. Each of the variable orifices V1, V2, V3 and V4 has a characteristic as illustrated by the line A2 in FIG. 16. Each of the variable orifices V5 and V6 of the second bridge circuit C2 is of a center-close type, the initial state of which is shown in FIG. 14. Each of the variable orifices V7 and V8 of the second bridge circuit C2 is of a center-open type, the initial state of which is shown in FIG. 15. Each of the variable orifices V5 and V6 has a characteristic such as illustrated by the line A0 in FIG. 16. Each of the variable orifices V7 and V8 has a characteristic as illustrated by the line A1 in FIG. 16.

The operation of the power steering apparatus according to this embodiment will now be explained. The pressurized fluid discharged from the pump 10' is supplied to the first and second bridge circuits C1 and C2 via the first and second metering orifices 22 and 23. When the steering wheel 13 is not rated, i.e., when the control valve 14' is in its neutral position, the variable orifices V5 and V6 of the second bridge C2 are closed. In such state, the pressurized fluid is not supplied to power cylinder 12, and both fluid chambers 12A and 12B are allowed to communicate with the reservoir 11 so that the internal pressures of the fluid chambers 12A and 12B of the power cylinder 12 is maintained extremely low or zero. The pressurized fluid output from the pump 10 is drained to the reservoir 11 through the variable orifices V1, V2, V3 and V4 of the bridge circuit C1 without resistance.

In such a neutral state, the variable orifice portion 28 of the load responsive valve 29 is fully opened, and the spring chamber of the bypass valve 26 communicates with the reservoir 11 through the second control orifice 32 and the variable orifice portion 28. Accordingly, the pressure in the spring chamber of the bypass valve 26 is low so that the valve spool 26a is located at its retracted position. Therefore, the bypass passage 25 is fully opened. With this operation, a great part of the pressurized fluid output from the pump unit 20 is bypassed to the reservoir 11 via the bypass passage 25. Accordingly, the flow rate Q of the pressurized fluid supplied to the bridge circuits C1 and C2 is reduced to Q1 as shown by a broken line in FIG. 11.

When the steering operation of the steering wheel 13 produces a rotation of the valve shaft 15 relative to the valve body 16, the opening areas of the variable orifices V1 and V4 of the first bride C1 increase while the opening areas of the remaining variable orifices V2 and V3 decrease, even if the relative rotation of the valve shaft 15 is a slight amount. In response to this, the pressure of the fluid output from the pump 10, i.e. the back pressure of the rotary valve 14' gradually increases. When the back pressure reaches a predetermined value, the valve spool 29a of the load responsive valve 29 is moved against the spring 31 so that the opening of the variable orifice portion 28 is reduced, and finally closed when the back pressure increases further more. With this operation, the pressure in the spring chamber of the bypass valve 26 increases so that the spool 26a is moved to close, the bypass passage 25. Accordingly, the flow rate. Q of the pressurized fluid supplied to the bridge circuits C1 and C2 increases, as shown in FIG. 12. In FIG. 12, P indicates the back pressure of the control valve 14'.

Figure 17:
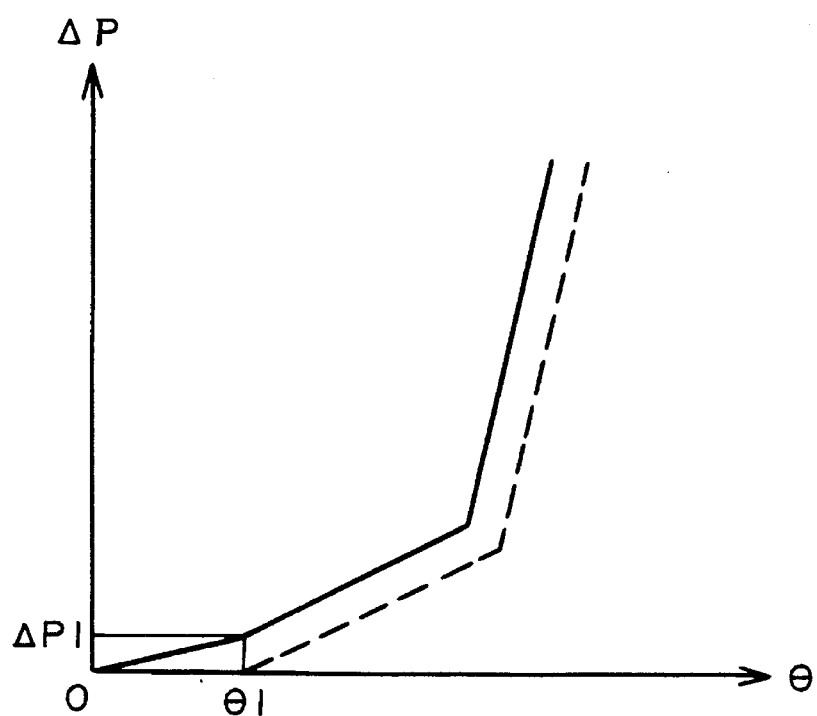
FIG. 17 is a graph showing the relationship between the relative rotational angle of the valve and the differential pressure in the power cylinder.

As explained above, the pressure of fluid output from the pump 10' gradually increases in response to rotation of the steering wheel 13. However, the differential pressure ΔP produced between the fluid chambers 12A and 12B of the power cylinder 12 is maintained zero until the rotational angle of the valve 14' reaches θ1, because the variable orifices V5 and V6 of the second bridge circuit C2 are in the closed state until the rotational angle of the valve 14' reaches θ1. Accordingly, in the neutral zone in which the rotational angle of the valve 14' becomes smaller than θ1 it becomes possible to prevent the difference in pressure ΔP between the fluid chambers 12A and 12B of the power cylinder 12 from increasing, as illustrated by the broken line in FIG. 17. In such a state, a steering feeling similar to that in the non-assisted steering apparatus can be given to the driver.

When the rotational angle of the valve 14' exceeds 81, one of the variable orifices V5 and V6 starts to open so that the pressure in one of the fluid chambers 12A and 12B of the power cylinder 12. Simultaneously with this, the variable orifices V2 and V3 or V1 and V4 of the first bridge circuit C1 are closed. After that, the pressurized fluid output from the pump 10' is supplied only to the second bridge circuit C2 so that a hydraulic force is generated for assisting the steering operation.

The power steering apparatus according to this embodiment can reduce the flow rate of pressurized fluid required for the power assist operation by half. This makes it possible to reduce the theoretical fluid supply amount of the pump unit 20, whereby the energy consumed by the pump 10' can be reduced.

The power steering apparatus in the above embodiment uses a speed responsive pump which changes the flow rate of pressurized fluid in accordance with the rotational speed of the pump. However, the present invention can be applied to other types of power steering apparatus in which the flow rate is controlled in accordance with the vehicle speed, or maintained constant regardless of changes in the rotational speed of the pump or the vehicle speed.

Third Embodiment

Figure 18:
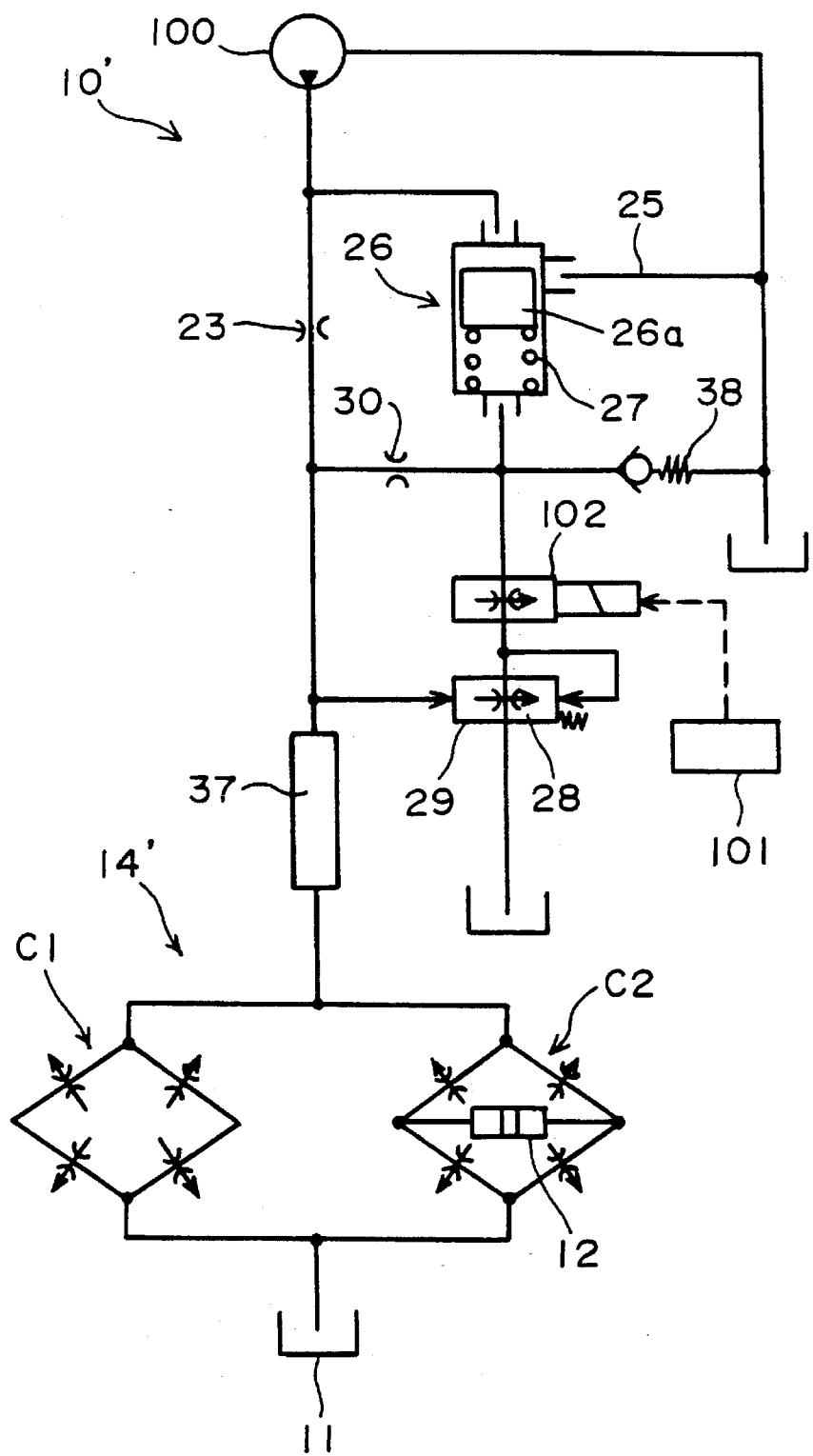
FIG. 18 is a diagram showing a power steering apparatus according to a third embodiment of the present invention.

A power steering apparatus according to this embodiment is similar to the second embodiment, but the apparatus is constituted such that the flow rate of pressurized fluid supplied to the rotary valve 14' is changed in accordance with the vehicle speed. In this embodiment, a pump 100 of a constant displacement type is used. Further, an electromagnetic valve 102 is disposed between the spring chamber of the bypass valve 26 and the load responsive valve 29, as shown in FIG. 18. The opening of the electromagnetic valve 102 is controlled in accordance with the vehicle speed detected by a speed sensor 101 so that the opening area of the electromagnetic valve 102 is increased in accordance with an increase in the vehicle speed.

Fourth Embodiment

Figure 19:
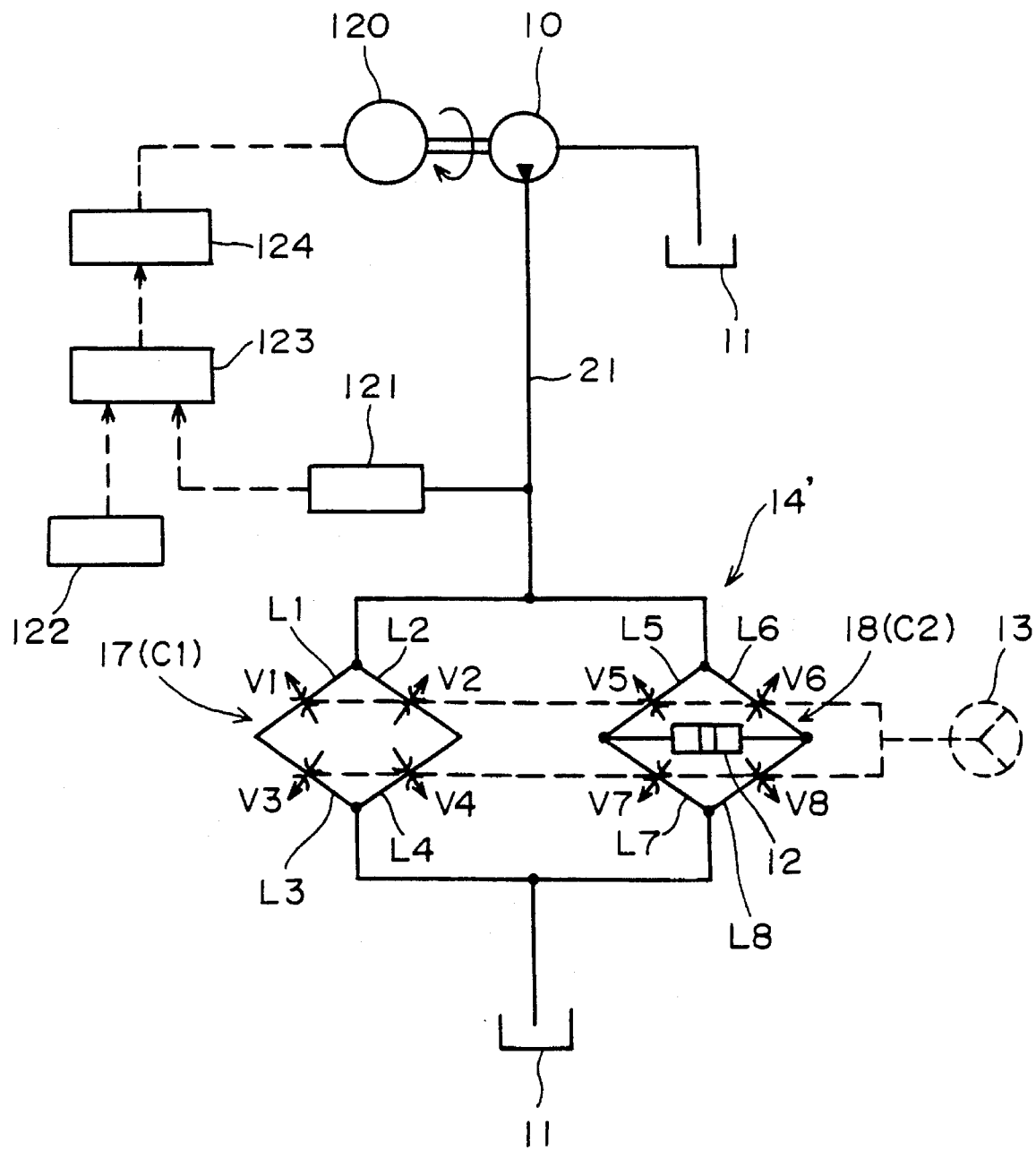
FIG. 19 is a diagram showing a power steering apparatus according to a fourth embodiment of the present invention.

In this embodiment, the pump 10 is driven by an electric motor 120 as shown in FIG. 19. The motor 120 is controlled based on vehicle speed detected by a speed sensor 122, and the back pressure of the control valve 14' detected by a pressure switch 121. The output signals from the speed sensor 122 and the pressure switch 121 are input to a controller 123. The controller 123 calculates a motor speed signal based on the input signals, and outputs the motor speed signal to a motor control unit 124 which controls the rotation of the motor 120. Namely, the controller 123 controls the motor drive unit 124 such that the rotational speed of the motor 120 increases when the pressure in the supply passage 21 increases in response to the steering operation of the steering wheel 13, and that the rotational speed of the motor 120 decreases when the vehicle speed reaches a predetermined speed.

Since the structure of the control valve 14' is the same as that of the control valve used in the second and third embodiments, an explanation thereof will be omitted here.

The operation of the power steering apparatus according to this embodiment will now be explained.

When the control valve 14' is in the neutral state, the pressurized fluid discharged from the pump 10 flows to the reservoir 11 via the variable orifices V1, V2, V3 and V4 of the bridge circuit C1 without resistance. Therefore, the pressure in the supply passage, i.e., the back pressure of the control valve 14' is low and the pressure switch 121 does not output any signal. In such a case, the motor 120 for driving the pump 10 is rotated at a low speed so that the flow rate of pressurized fluid output from the pump 10 is reduced. This reduces the energy consumed by the pump 10. Since the variable orifices V5 and V6 of the second bridge C2 are closed in such a neutral state, the pressurized fluid is not supplied to the power cylinder 12, and the both fluid chambers thereof are allowed to communicate with the reservoir 11 via the variable orifices V7 and V8 so that the internal pressures of the fluid chambers of the power cylinder 12 is maintained to be extremely low or zero.

When the steering operation of the steering wheel 13 produces a rotation of the valve shaft 15 relative to the valve body 16, the opening areas of the variable orifices V1 and V4, or V2 and V3 of the first bride C1 increase while the opening areas of the remaining variable orifices decrease, even if the relative rotation of the valve shaft 15 is a slight amount. In response to this, the pressure of the fluid output from the pump 10, i.e. the back pressure of the control valve 14' gradually increases. The variable orifice V5 or V6 of the bridge circuit C2 starts to open when the valve rotational angle reaches 81, and the pressure in the supply passage 21 reaches the predetermined value when the valve rotational angle reaches 82, whereby the pressure switch 121 becomes on. In response to an ON-signal from the pressure switch 121, the controller 123 increases the rotational speed of the motor 120 so that a sufficient amount of pressurized fluid is output from the pump 10.

In this embodiment, the start of steering operation is detected using a pressure sensor 121 which detects the back pressure of the control valve 14'. However, the start of the steering operation can be detected in another manner, for example, by detecting the angle of relative rotation of the control valve.

Since the motor 120 driving the pump 10 is controlled in accordance with the back pressure or the control valve (load pressure) and the vehicle speed in the above-embodiment, it is advantageous that the flow rate of pressurized fluid can be changed based on the vehicle speed as well as steering operation. The control based on the vehicle speed, however, is not essential and may be omitted.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus having a fluid source for discharging pressurized fluid, a power cylinder, a control valve responsive to operation of a steering wheel, said control valve supplying the power cylinder with pressurized fluid from the fluid source, and a reservoir, wherein said control valve comprises:

a first control portion fluidically disconnected from said power cylinder, said first control portion controlling the flow of pressurized fluid from said fluid source to said reservoir and having a path connecting said fluid source and said reservoir, said path including at least one variable orifice of a center-open type which opens when said control valve is in a neutral state and which gradually restricts the flow of fluid from said fluid source to said reservoir upon turning of said steering wheel in one direction causes said control valve to shift from the neutral state; and a second control portion fluidically connected to said power cylinder and controlling the flow of pressurized fluid to said power cylinder, said second control portion having two supply paths communicating with said fluid source and a pair of chambers of said power cylinder, each of said supply paths including a variable orifice of a center-close type which closes when said control valve is in the neutral state and which gradually opens as turning of said steering wheel in a corresponding one direction causes said control valve to shift from the neutral state.

2. A power steering apparatus according to claim 1, wherein said first control portion forms a first fluid bridge circuit having two supply paths communicating with said fluid source and two drain paths communicating with said reservoir, each of said four paths including a variable orifice of a center-open type which opens when said control valve is in the neutral state, and wherein said second control portion forms a second fluid bridge circuit having two supply paths communicating with said fluid source and said chambers of said power cylinder and two drain paths communicating with the chambers of said power cylinder and said reservoir, each of the supply paths of said second control portion including a variable orifice of a center-close type which closes when said control valve is in the neutral state, and each of said drain paths of said second control portion including a variable orifice of a center-open type which opens when said control valve is in the neutral state.

3. A power steering apparatus according to claim 1, wherein in the neutral state, an underlapping amount of the variable orifices of said first control portion is larger than an overlapping amount of the variable orifices of said second control portion, whereby no power assistance is generated by said power cylinder until said steering wheel is turned to exceed a predetermined angle away from said neutral state in either direction.

4. A power steering apparatus according to claim 3, wherein said fluid source comprises an engine-driven pump discharging pressurized fluid at a constant rate.

5. A power steering apparatus according to claim 1, further comprising:

a flow rate control reducing the amount of fluid supplied to said control valve when said control valve is in the neutral state and increasing the amount of the fluid in accordance with an increase in the back pressure of said control valve.

6. A power steering apparatus according to claim 5, wherein said first control portion forms a first fluid bridge circuit having two supply paths communicating with said fluid source and two drain paths communicating with said reservoir, each of said four paths being formed with a variable orifice of a semi center-open type which opens when said control valve is in the neutral state, and said second control portion forms a second fluid bridge circuit having two supply paths communicating with said fluid source and the chambers of said power cylinder and two drain paths communicating with the first and second chambers of said power cylinder and said reservoir, each of the supply paths of said second control portion being formed with a variable orifice of a center-close type which closes when said control valve is in the neutral state, and each of the drain paths of said second control portion being formed with a variable orifice of a center-open type which opens when said control valve is in the neutral state, and wherein each of said variable orifices of said first control portion starts to close when the variable orifices of said supply paths of said second control portion start to open.

7. A power steering apparatus according to claim 5, wherein said flow rate control comprises:

a metering orifice disposed in the middle of a supply passage through which pressurized fluid is supplied to said control valve;

a bypass valve responsive to a pressure drop across the metering orifice, said bypass valve bypassing part of pressurized fluid output from said fluid source to said reservoir; and a load responsive mechanism responsive to the back pressure of said control valve to control said bypass valve so as to increase the amount of fluid bypassed to said reservoir when the back pressure is low and decrease the amount of fluid bypassed to said reservoir when the back pressure becomes high.

8. A power steering apparatus according to claim 7, wherein said bypass valve has a spring chamber in which a spring is located, said spring urging a valve spool of said bypass valve to move in a direction reducing the amount of bypassed fluid and which is connected to the supply passage at the downstream side of said metering orifice, and said load responsive mechanism includes a load responsive valve disposed between the spring chamber of said bypass valve and said reservoir, said load responsive valve fluidicly connecting the spring chamber with said reservoir when the back pressure of the control valve is low.

9. A power steering apparatus according to claim 8, wherein said load responsive valve further comprises an electromagnetic valve disposed in a fluid path between the spring chamber and said load responsive valve.

10. A power steering apparatus according to claim 1, wherein said fluid source comprises a pump, and said power steering apparatus further comprises:

a motor driving said pump;

a detection mechanism detecting steering operation of the steering wheel; and a control mechanism controlling the rotational speed of said motor in response to a signal output from said detection means.

11. A power steering apparatus according to claim 10, wherein said apparatus further comprises a speed sensor detecting the speed of a vehicle, and said control mechanism controls said motor such that the rotational speed of said motor decreases as the speed of the vehicle increases.

12. A power steering apparatus having a fluid source for discharging pressurized fluid, a power cylinder having first and second chambers, a control valve responsive to operation of a steering wheel and supplying said power cylinder with pressurized fluid from said fluid source and a reservoir, wherein said control valve comprises:

a first control portion fluidicly disconnected from said power cylinder and including a first variable orifice mechanism gradually restricting the flow of fluid from said fluid source to said reservoir so as to increase the pressure of fluid at the upper stream of said control valve as said steering wheel is turned from a neutral position in either direction; and a second control portion fluidically connected to said power cylinder and including a second variable orifice mechanism substantially preventing fluid from said fluid source from being supplied to either chamber of said power cylinder while permitting fluid to flow from either chamber to said reservoir when said steering wheel is at a position around the neutral position and which supplies fluid from said fluid source to one of said first and second chambers of said power cylinder while permitting the flow of fluid from the other chamber of said power cylinder to said reservoir when said steering wheel is turned from the position around said neutral position in either direction.

13. A power steering apparatus according to claim 12, wherein said second variable orifice mechanism begins to substantially supply fluid to said second chamber of said power cylinder after said steering wheel is turned a predetermined angle from the neutral position in either direction so that no power assistance is generated by said power cylinder until said steering wheel is turned from the neutral position beyond said predetermined angle.

14. A power steering apparatus according to claim 13, wherein said first variable orifice mechanism of said first control portion comprises four variable orifices of a center-open type all of which open to permit fluid to flow from said fluid source to said reservoir when said steering wheel is at the neutral position, and wherein said second variable mechanism orifice of said second control portion comprises two variable orifices of center-close type which close to prevent fluid from being supplied to any of the opposite chambers of said power cylinder when said steering wheel is at the position around the neutral position and two other variable orifices of center-open type which open to permit fluid to flow from any of the opposite chambers to said reservoir when said steering wheel is at the position around the neutral position.

15. A power steering apparatus according to claim 12, wherein said control valve comprises a valve shaft and a valve body coaxially receiving said valve shaft therein for relative rotation, and wherein said first and second control portions are arranged between outer and inner surfaces of said valve shaft and valve body in the circumferential direction thereof.

16. A power steering apparatus having a pump for discharging pressurized fluid, a power cylinder having a first and second chamber, a control valve of a rotary type operable by a steering wheel and supplying said power cylinder with pressurized fluid from said pump, and a reservoir wherein said control valve comprises:

a valve shaft connected to be rotated by said steering wheel;

a valve body coaxially receiving said valve shaft therein, said valve body being rotatable relative to said valve shaft;

a plurality of first control portions provided between mating outer and inner surfaces of said valve shaft and said valve body in a circumferential direction thereof and fluidically disconnected from said power cylinder, each of said first control portions including a first variable orifice gradually restricting the flow of fluid from said pump to said reservoir so as to increase the pressure of fluid at the upper stream of said control valve as said steering wheel is turned from a neutral position in either direction; and a plurality of second control portions provided between said mating outer and inner surfaces of said valve shaft and said valve body alternatively with said first control portions in the circumferential direction thereof and fluidically connected to said power cylinder, each of said second control portions including a second variable orifice substantially preventing fluid from said pump from being supplied to either chamber of said power cylinder, but permitting fluid to flow from either chamber to said reservoir when said steering wheel is at the position around the neutral position, said second variable orifice being operable for gradually supplying fluid from said pump to one of said first and second chambers of said power cylinder while permitting the flow of fluid from the other chamber of said power cylinder to said reservoir when said steering wheel is turned from the position around said neutral position in either direction.

17. A power steering apparatus according to claim 16, wherein said first control portions comprise two control portions which are arranged opposite each other diametrically of said valve shaft and valve body, and wherein said second control portions comprise two control portions which are arranged opposite each other diametrically of said valve shaft and valve body.

* * * * *